United States Patent
Marsden

(10) Patent No.: US 8,325,141 B2
(45) Date of Patent: *Dec. 4, 2012

(54) CLEANABLE TOUCH AND TAP-SENSITIVE SURFACE

(75) Inventor: Randal J. Marsden, Edmonton (CA)

(73) Assignee: Madentec Limited, Edmonton, Alberta (CA)

( * ) Notice: Subject to any disclaimer, the term of this patent is extended or adjusted under 35 U.S.C. 154(b) by 709 days.

This patent is subject to a terminal disclaimer.

(21) Appl. No.: 12/234,053

(22) Filed: Sep. 19, 2008

(65) Prior Publication Data

US 2009/0073128 A1    Mar. 19, 2009

Related U.S. Application Data

(60) Provisional application No. 60/973,691, filed on Sep. 19, 2007.

(51) Int. Cl.
G06F 3/02 (2006.01)
G09G 5/00 (2006.01)

(52) U.S. Cl. .................................................. 345/168
(58) Field of Classification Search .............. 345/168
See application file for complete search history.

(56) References Cited

U.S. PATENT DOCUMENTS

| | | | |
|---|---|---|---|
| 6,492,979 B1 | 12/2002 | Kent et al. | |
| 6,504,530 B1 * | 1/2003 | Wilson et al. | 345/173 |
| 6,525,717 B1 * | 2/2003 | Tang | 345/177 |
| 6,650,318 B1 | 11/2003 | Arnon | |
| 6,657,616 B2 | 12/2003 | Sims | |
| 7,499,039 B2 | 3/2009 | Roberts | |
| 7,557,312 B2 | 7/2009 | Clark et al. | |
| 7,659,885 B2 | 2/2010 | Kraus | |
| 7,663,607 B2 | 2/2010 | Hotelling et al. | |
| 2003/0235452 A1 * | 12/2003 | Kraus et al. | 400/472 |
| 2005/0104867 A1 * | 5/2005 | Westerman et al. | 345/173 |
| 2006/0152499 A1 * | 7/2006 | Roberts | 345/173 |
| 2006/0180450 A1 * | 8/2006 | Clark et al. | 200/333 |
| 2006/0192763 A1 | 8/2006 | Ziemkoski | |
| 2006/0232558 A1 | 10/2006 | Chien | |
| 2006/0279548 A1 * | 12/2006 | Geaghan | 345/173 |
| 2006/0284858 A1 | 12/2006 | Rekimoto | |

(Continued)

FOREIGN PATENT DOCUMENTS

JP    63311521 A    12/1998

(Continued)

OTHER PUBLICATIONS

Delvin Medical; CleanKey Keyboard; www.DelvinMedical.co.uk; Hampshire, UK, Apr. 1, 2009.

Primary Examiner — Quan-Zhen Wang
Assistant Examiner — Nelson D Runkle, III
(74) Attorney, Agent, or Firm — Lowe Graham Jones PLLC

(57) ABSTRACT

A touch sensitive surface having touch-capacitive and vibration sensors. This surface allows the user to rest their fingers on the keys and type as they would on a regular keyboard. As the user places their fingers on the keys, the touch capacitive sensors (one per key) report the signal strength level of each key touched to a processor, but no keystroke is issued by the processor until a corresponding "tap" (ie. vibration) is detected. When a tap is detected, the processor references the status of the touch capacitance sensors before, during, and/or immediately after the moment in time the tap occurred.

37 Claims, 17 Drawing Sheets

U.S. PATENT DOCUMENTS

| | | |
|---|---|---|
| 2007/0236478 A1 | 10/2007 | Geaghan et al. |
| 2007/0247429 A1 | 10/2007 | Westerman |
| 2008/0042989 A1 | 2/2008 | Westerman |
| 2008/0273013 A1 | 11/2008 | Levine et al. |
| 2008/0309519 A1 | 12/2008 | Bengtsson et al. |

FOREIGN PATENT DOCUMENTS

| | | |
|---|---|---|
| JP | 2002-297316 A | 10/2002 |
| KR | 20-0191841 Y1 | 8/2000 |
| WO | 2006/039033 A2 | 4/2006 |
| WO | 2007144014 A1 | 12/2007 |

* cited by examiner

CLEANABLE TOUCH AND TAP-SENSITIVE SURFACE

PRIORITY CLAIM

This application claims the benefit of U.S. Provisional Application Ser. No. 60/973,691 filed Sep. 19, 2007, which is incorporated by reference.

FIELD OF THE INVENTION

The invention relates to a smooth touch-sensitive surface that is easy to clean and that allows the user to rest their hands or fingers on the surface without causing an event actuation. More specifically, the touch surface may be used as a computer keyboard for inputting text and commands.

BACKGROUND OF THE INVENTION

The origin of the modern keyboard as the primary method for inputting text and data from a human to a machine dates back to early typewriters in the $19^{th}$ century. As computers were developed, it was a natural evolution to adapt the typewriter keyboard to be used as the primary method for inputting text and data. While the implementation of the keys on a typewriter and subsequently computer keyboards have evolved from mechanical to electrical and finally to electronic, the size, placement, and mechanical nature of the keys themselves have remained largely unchanged.

Computers, and their accompanying keyboards, have become pervasive in environments across numerous industries, many of which have harsh conditions not originally accounted for in the computer and keyboard designs. For example, computers are now used in the kitchens of restaurants, on production floors of manufacturing facilities, and on oil drilling rigs. These are environments where a traditional keyboard will not remain operational for very long without cleaning, due to extreme contamination conditions.

Computers are also being used in environments where extreme cleanliness is required. Hospital nursing stations, operating rooms, examination rooms, dental treatment rooms, and diagnostic facilities all now commonly make use of computers. These are environments where infection control is extremely important. Keyboards become a particularly difficult problem to resolve in achieving an antiseptic environment because of the difficulty presented in cleaning them. This is evidenced by a study conducted by the Tripler Army Medical Center in Honolulu, Hi. that found that nearly 25 percent of the keyboards used in the hospital harbored the type of bacteria that is responsible for 95% of all hospital-acquired illnesses.

Because of the mechanical nature of the keys on traditional keyboards, they contain many moving parts that result in cracks and cavities where dust and contamination can collect. Further, keyboards are repeatedly in contact with human hands—one of the most common transporters of dirt, bacteria, viruses, and other infectious agents. Cleaning a traditional mechanical keyboard presents difficult challenges. On a typical keyboard, there are over 500 individual surfaces to clean (counting the tops and sides of each key). Many of these surfaces are very difficult to access and clean effectively, especially without pressing down on the keys, meaning they must be cleaned while the keyboard is disabled or the computer turned off.

Some past inventions have sought to address the problem of clean-ability by using sealed rubber keys on the keyboard. These keyboards are made from soft, pliable rubber (typically silicon rubber) that is molded and sealed over the electrical key contacts providing a moisture barrier. This makes it possible, for example, to place the keyboard under running water to clean it. The keys still have mechanical travel and a tactile feel, which is generally considered favorable for fast and efficient typing.

While this approach makes it possible to clean the keyboard, there are still many problems related to the use of rubberized keyboards. First of all, rubber is porous, which means dirt and other contaminants tend to collect more easily at the microbial level and are more difficult to wipe clean, often requiring more rubbing and/or solvents to separate the contaminants from the rubber. Second, in typical configurations, the rubber keys protrude from the rubber base so there are still small gaps between the keys that are difficult to get to and clean by wiping.

Some rubber configurations avoid the problem of gaps between keys by stretching a smooth thin sheet of silicon rubber over the entire keyboard area of a regular keyboard, and then marking the key locations with a graphical image on the rubber cover. This approach makes it possible to clean the keyboard by wiping, and still maintains the tactile feel of the travel and click of the mechanical keys below the cover (although it is somewhat dampened by the rubber cover). However, the problem of the porous nature of the rubber still exists. Finally, the rubber membrane is soft and susceptible to cracks, tears, and deep scratches. These can cause further problem areas for potential contamination.

Another type of cleanable configuration is a membrane keyboard (or keypad). These are typically made by sandwiching a sensor membrane between a hard flat surface (such as plastic) and a top covering made from vinyl or Mylar®. These units are completely sealed by the top covering, permitting them to be cleaned. The sensor membrane is typically made up of two thin sheets with a conductive grid on each that make contact with each other when the membrane is pressed firmly together. The amount of mechanical travel required to do this is very small and virtually imperceptible to the human touch, meaning there is no tactile feedback when a key is pressed. Some membrane keyboards are completely smooth and flat, while others have small protrusions in the top covering to indicate the outlines of each key.

The advantage of a membrane keyboard is that it is flat with no gaps between the keys, making it easy to wipe and clean. The primary shortcoming of a membrane keyboard is that is difficult to type on efficiently. It is often difficult to feel the keys, resulting in the user having to look at the keyboard. The lack of tactile feedback also slows typing. And finally, the amount of force to actuate a membrane key is usually much higher than that of a normal keyboard, causing the user to fatigue more quickly.

Yet another way to address the clean-ability problem is to cover the keyboard with a commercially available plastic film that has been molded to fit over each key. The plastic film is pliable, allowing the user to feel the movement of each key, so they are still able to type without looking. The cover can be removed, washed, and then put back on the keyboard. In some instances, users cover their keyboard with stretchy plastic wrap (commercially known as Saran wrap) in order to make it more readily cleanable.

Because the molded cover has indents for each key, it is still difficult to clean while in place; it is usually necessary to remove the cover in order to clean it. The molded plastic film also impedes the movement and feel of the keys making it somewhat more difficult to type when it is in place.

To overcome the problem of clean-ability of the keyboard, it seems intuitive that if the keyboard surface itself could be a flat, or nearly flat planar surface, then wiping the keyboard to clean it would be much easier. This means, however, that an alternative to the physical mechanical or membrane keys of the keyboard would need to be found.

Therefore, there is a need to improve on the above methods for keyboard entry in a way which is easy to clean, allows the user to feel the keys, allows the user to rest their fingers on the keys, requires the same or less force to press a key as on a standard keyboard, is responsive to human touch, and allows the user to type as fast or faster as on a standard keyboard.

SUMMARY OF THE INVENTION

The method of the present invention is distinguished by the fact that both touch-capacitive and vibration sensors are used in conjunction one with another. This approach makes it possible for the user to rest their fingers on the keys, allowing them to type as they would on a regular keyboard. As the user places their fingers on the keys, the touch capacitive sensors (one per key) report the signal strength level of each key touched to the processor, but no keystroke is issued by the system until a corresponding "tap" (ie. vibration) is detected. When a tap is detected, the present invention references the status of the touch capacitance sensors before, during, and immediately after the moment in time the tap occurred. A key is determined to be asserted when around the moment of a tap, its touch sensor either cycles from on, then off, then on again (a key on which the user was resting their finger) or from off then on (a key on which the user was not resting their finger). The present invention is also able to detect the difference between an intentional key press and when a user has slid their finger from one key to the next (as opposed to an actual key tap). For example, the user's middle finger may slide from one row to the next as the user reaches for a key and taps on it with their index finger. The present invention can thus distinguish between accidental and intentional key actuations.

There may be instances when a user needs to press a key on which their finger is already resting. They may do so in one of two ways: first, they may lift their finger and then tap it back down on the same key on which it was resting as they would any other key. Alternatively, the user may press down harder on the key without lifting their finger completely off the key, in which case the touch sensor for that key emits a stronger signal than when the finger was resting on the key more lightly. The stronger signal is detected and a key press is asserted.

The method of the present invention has a number of very significant advantages over prior flat keyboard systems such as those disclosed by Chien and Arnon. One is that the keyboard can have tactile key surfaces so the user can maintain the position of their hands on the keyboard (and thus by able to type without looking at their hands). In a preferred embodiment, the tactile surface is accomplished by shallow indentations, or key "wells", over each key. The key wells are gradually sloped in a way that is still easy to wipe clean, yet deep enough to feel with the finger. In another preferred embodiment, there are small protrusions on the "home" keys (f and j keys) typically touched by the pointer finger. In yet another preferred embodiment, the key wells are slightly deeper on the home keys as well as the keys typically rested-on by the little fingers ("a" and ";" keys). This allows the user stronger anchor points on the keys normally used to anchor the position of their hands to the keyboard.

In contrast to the vibration-only system described by Chien or Ziemkowski, the present invention allows simultaneous key presses between two or more keys by using the touch-capacitive sensors on each key without requiring an additional mode of sensors (such as pressure). In a similar manner, key repeats are also honored when caused by a user holding down a key for an extended period of time.

The method of the present invention has significant advantages over prior capacitive keyboards such as that disclosed by Danish. One such advantage is that the user can rest their fingers on the keys without causing a key actuation to occur. Another is that the user can type by touch without having to look at the keyboard.

The system of the present invention allows the user to view a virtual image of the keys through a transparent top planar surface. In a preferred embodiment, the virtual image is printed on a flat label that is located under a transparent top planar surface that may (or may not) have key wells.

The system of the present invention can accommodate a wireless battery-powered implementation. A number of innovations are used to conserve battery life. One innovation is the entire system can be put in low-power mode (or "sleep" mode) with the exception of a proximity sensor (or sensors) that can detect when a user's hand approaches the keyboard. Upon detecting the presence of said user's hands, the proximity sensor "wakes up" the rest of the system. In this way, the system remains in low power mode while it is not being used. A further power-conservation innovation is achieved by putting the touch-capacitance sensors in lower-power mode and then periodically waking them up to quickly sample the state of each key. The duty cycle of this approach is such that the touch-sensors are in sleep mode most of the time—even when the keyboard is being used, thus extending the life of the system's batteries.

Because the system of the present invention can be wireless, it is common for it to be moved while the device is operational. This may result in unintentional key assertions. To alleviate this problem, the vibration sensor (also known as an accelerometer) can detect when the device is being moved, and temporarily suspend operation during that time. Once the keyboard stops moving, operation can be automatically restored.

The system of the present invention includes a speaker to provide audible feedback when a user actuates a key. The sound may be a click, beep, digitized recording of an actual key click, or any other short sound.

The method of the present invention allows for numerous user settings that can be adjusted from the keyboard itself. These include adjustments to the touch-capacitive sensitivity, the tap sensitivity, and the volume of the audible feedback.

The method of the present invention also detects when a keyboard is being wiped. There is a two-key combination assigned to "pause" the keyboard so it can be cleaned. However, some users forget to do this and just begin wiping down the keyboard to clean it, without first pausing its operation. This can result in unintended keystrokes. Accordingly, the present invention detects when a wipe motion is taking place and automatically pauses the keyboard's operation for the user. Any keystrokes that were asserted immediately prior to the detection of a wipe and which are subsequently deemed to have been part of the wiping motion may be reversed automatically by the system issuing a backspace or delete key for each unintentional key assertion. The keyboard pause light flashes, reminding the user to re-enable the keyboard operation with the two-key combination once they are done cleaning it.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
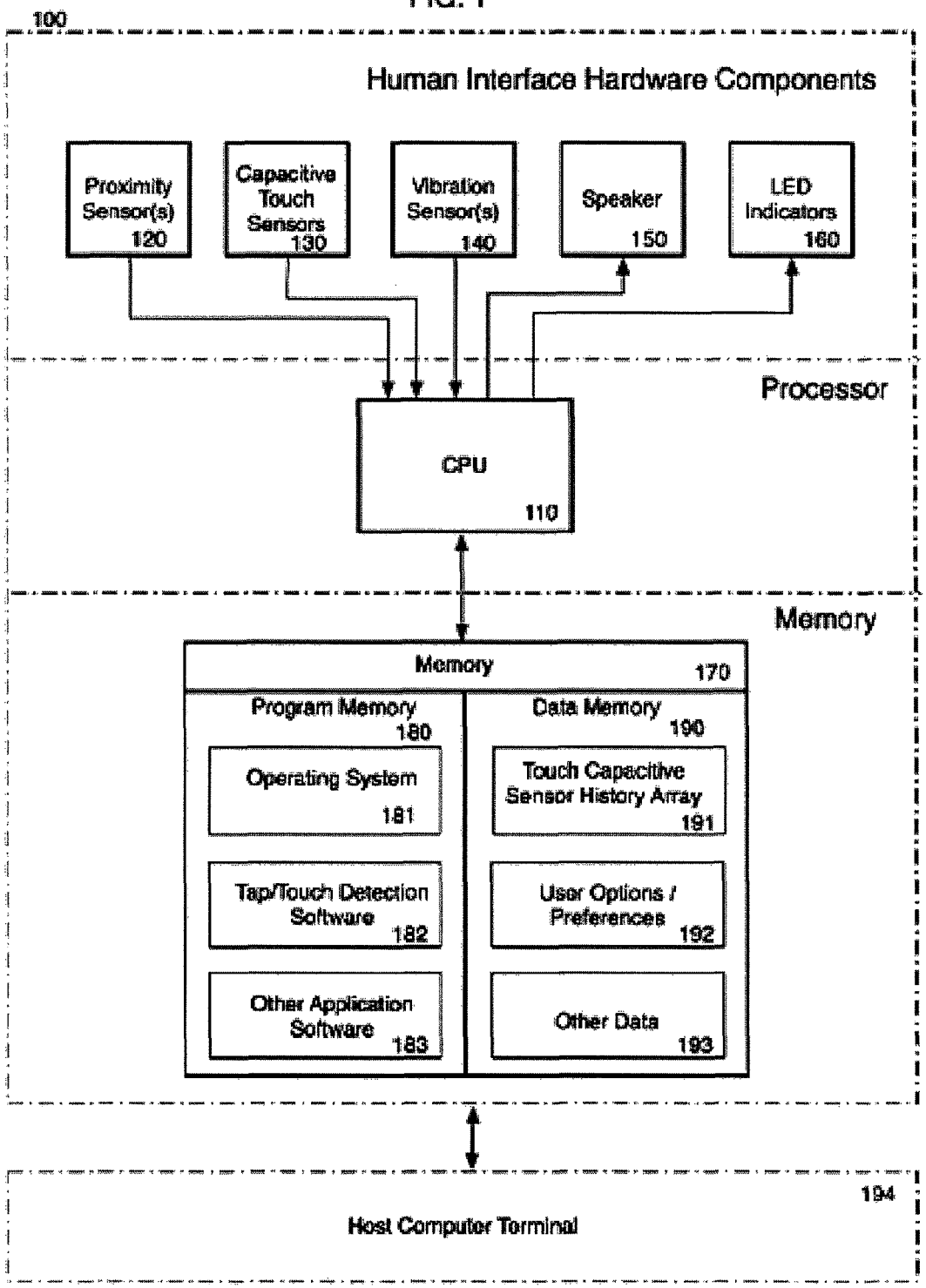
FIG. 1 is a hardware block diagram showing the typical hardware components of a system which embodies the present invention as shown in FIG. 2.

FIG. 1 shows a simplified block diagram of the hardware components of an embodiment of the Touch/Tap Sensitive Cleanable Keyboard 100. The device 100 includes a flat planar surface that houses a proximity sensor(s) 120, capacitive touch sensors 130, a vibration sensor(s) 140, an audio speaker 150, and LED visual indicators 160. The sensor components 120, 130, & 140 provide input to the CPU (processor) 110 notifying it of contact events when the keyboard surface is approached or touched by the user's hands, typically mediated by a hardware controller that interprets the raw signals received from the sensors and communicates the information to the CPU 110 using a known communication protocol via an available data port. Similarly, the CPU 110 communicates with a hardware controller for turning on LED indicators and outputting appropriate auditory signals to the speaker. The processor 110 has access to a memory 170, which may include a combination of temporary and/or permanent storage, and both read-only and writable memory (random access memory or RAM), read-only memory (ROM), writable non-volatile memory such as FLASH memory, hard drives, and so forth. The memory 170 includes program memory 180 that contains all the programs and software such as an operating system 181, the Touch-Tap Detection software 182, and any other application programs 183. The memory 170 also includes data memory 190 that includes the data array of the touch capacitive sensor status for each key, storage for maintaining a record of user options and preferences 192, and any other data 193 required by any element of the device 100. The device 100 communicates functions corresponding to user input to the host computer terminal 194 using a known communication protocol via an available data connection (wired or wireless).

In order to maximize battery life and conserve power, it is important that the device 100 have a low power mode of operation when it is not being used. In a typical use scenario, as a user brings their hand(s) into contact with the device, the proximity sensor 120 detects this and sends a signal to wake-up the CPU 110 (which may or may not have been in low-power, or "sleep" mode), which in turn wakes up the rest of the system 100.

As the user's fingers come into contact with the flat planar surface, capacitive touch sensors 130 are asserted. Periodically, the CPU 110 samples the status of each touch sensor and stores the result in data memory 191. Under the support of operating system software 181, the CPU ascertains the location of each touch sensor that is asserted and maps its location to a function (typically a keyboard key). Independently, the CPU 110 and touch/tap detection software 182 monitor the status of the vibration sensor 140. When a user taps on the planar surface, typically to type a key, a corresponding vibration is emitted throughout the system that is detected by the vibration sensor 140. When a valid tap is detected, the CPU 110, supported by software 182, performs an algorithmic analysis of the sensor data contained in memory 191 to determine which area of the planar surface was tapped on. If a valid tap-touch is determined by the algorithm (see FIG. 4A-H), the mapped function for that location is sent to the host computer terminal 194.

In an embodiment, the vibration sensor is also an accelerometer that can detect motion. This is used to detect when the device is being moved, allowing the option to have the device's operation temporarily suspended until it stops moving. The scheme helps to avoid unintended keystrokes from occurring while the keyboard is being moved, and also makes it possible for the user to touch anywhere on the surface of the keyboard as they are moving it.

Figure 2:
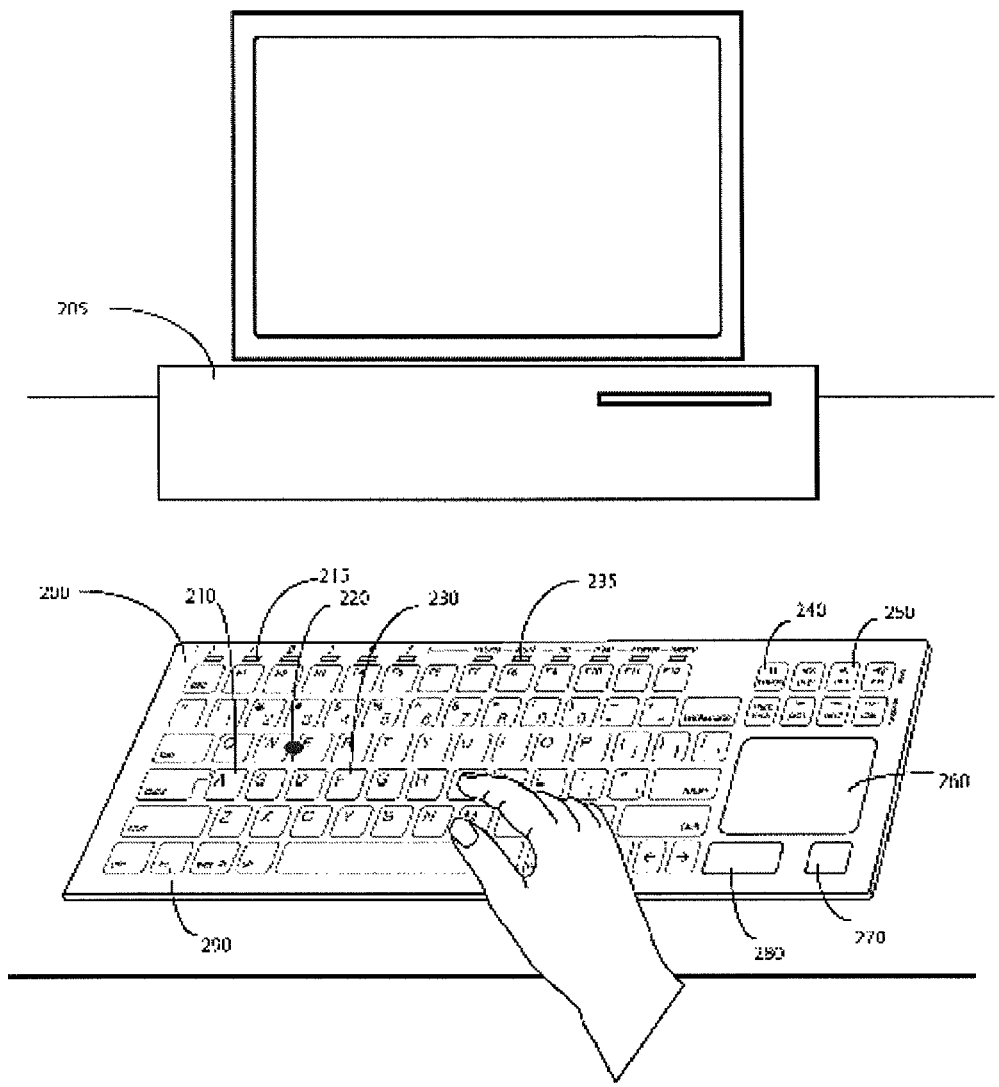
FIG. 2 is a schematic view of an embodiment of a flat-surfaced keyboard of the present invention.

FIG. 2 shows a schematic view representative of a typical host computer terminal 205 and the present invention 200. A flat, or nearly flat surface 200 is present to the user on which the user makes selections with their hands or fingers. In an embodiment, the planar surface 200 presents an image of keyboard keys 210, 230, 240 and so on, as well as a mouse-pointer touch pad 260 with corresponding left 280 and right 270 mouse buttons. A special function key 290 is provided as a means to set user preferences on the keyboard when it is pressed simultaneously with other keys. For example, the function key 290 is pressed simultaneously with the pause key 240 to temporarily suspend operation of the keyboard (typically so it can be cleaned). Other LED indicators on specific keys provide the user with feedback to indicate caps lock, numlock, a paused state.

In yet another embodiment, other users settings may be set directly on the keyboard. A separate row of LEDs 215 are used to indicate a generic level of 0 through 5. To enter Settings Mode, the user simultaneously presses the function key 290 with one of a plurality of other keys 235 to indicate the setting they wish to poll or change. An LED indicator lights above the selected setting key 235 while at the same time, the current level of the setting is indicated on the generic level LEDs, 0 through 5. The user can then change the level of the setting by pressing the desired key below the generic level LEDs. To exit Settings Mode, the user once again simultaneously pressed the function key and the setting key, or waits a for a pre-determined amount of time after which the system automatically exits to normal mode. In the embodiment, the user made poll and set the following settings: volume, touch sensitivity, tap sensitivity, the cleaning level, the strength of the wireless signal, the strength of the battery, and the sensitivity of the proximity sensor.

In yet another embodiment, the top planar surface of the device has shallow impressions, or "key wells" to provide a tactile feel indicating the location of a key. The key wells are deep enough to allow a human finger to feel them, but shallow enough to still allow easy wiping and cleaning of the surface. The two keys commonly referred to as the home keys (typically the "f" and "j" keys on an English keyboard) 230 may have additional tactile markers on them, such as a small protrusion as commonly found on standard keyboards. In yet another embodiment, the key wells are slightly deeper on the home keys 230 as well as the keys typically rested-on by the little fingers 210 ("a" and ";" keys). This allows the user stronger anchor points on the keys where studies have shown the user typically rests their fingers.

Figure 3:
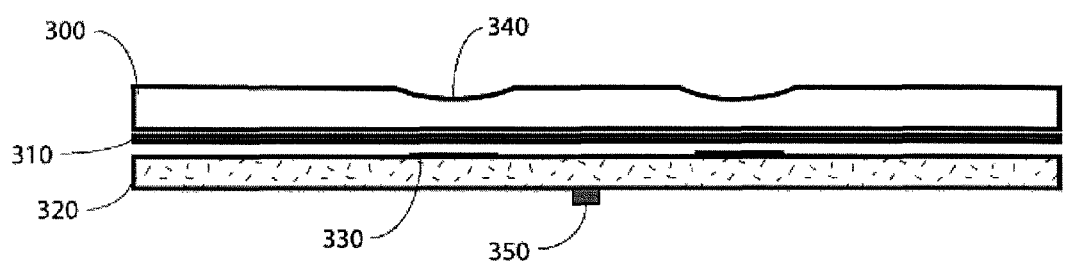
FIG. 3 is cross-section view of an embodiment of a flat-surfaced keyboard of the present invention showing the layers of the assembly.

FIG. 3 shows a cross-section of the components making up the top layer of the embodiment of the present invention. A top transparent planar layer 300 is the outer-most layer that the user touches. Shallow indentations, or key wells 340, are located over each key. An image 310 of the keyboard keys is presented on the underside of the top planar surface 300 by printing, painting, engraving, or affixing a label. A printed circuit-board 320 is adhered to the underside of the planar surface 300 that has conductive traces 330 that make up the touch sensors. Other electronic components, such as LEDs and the vibration sensor(s) 350 are located on the underside of the printed circuit-board 320.

Figure 4A:
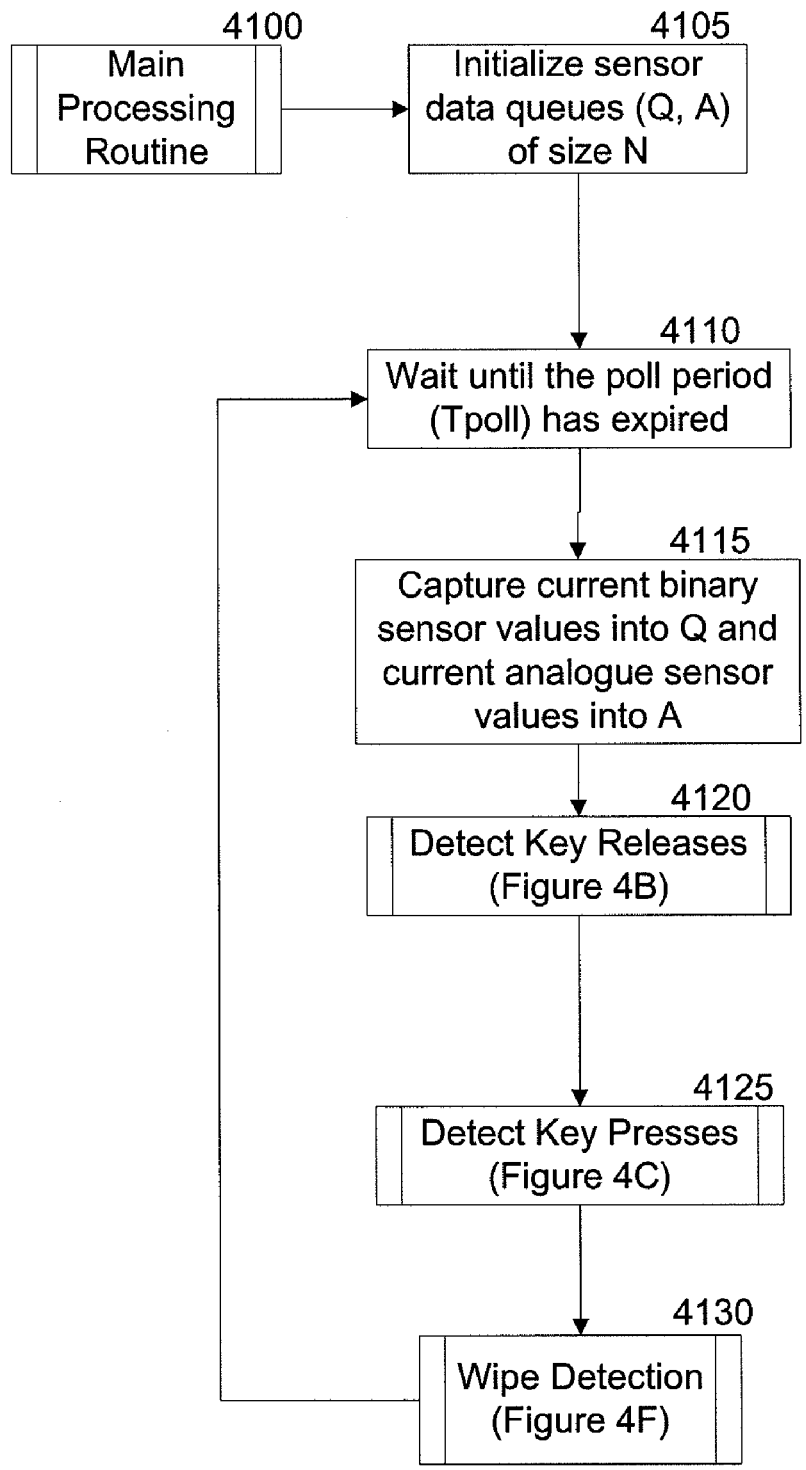
FIGS. 4A through 4I show an embodiment of a software algorithm to implement the method of the present invention in order to detect valid key presses and a wiping gesture.
Figure 4B:
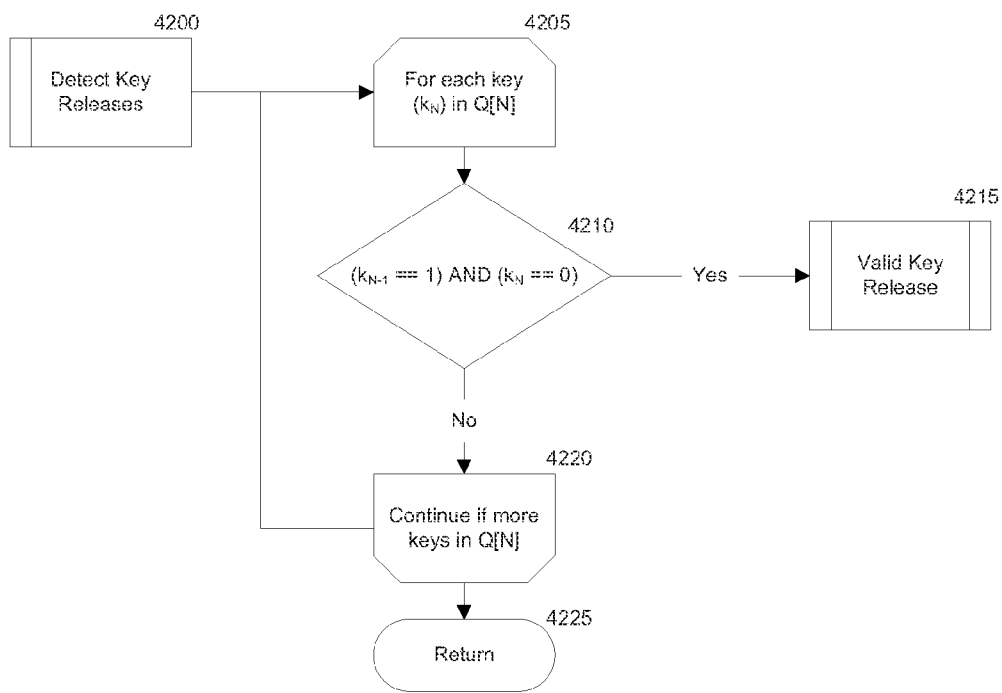
Figure 4C:
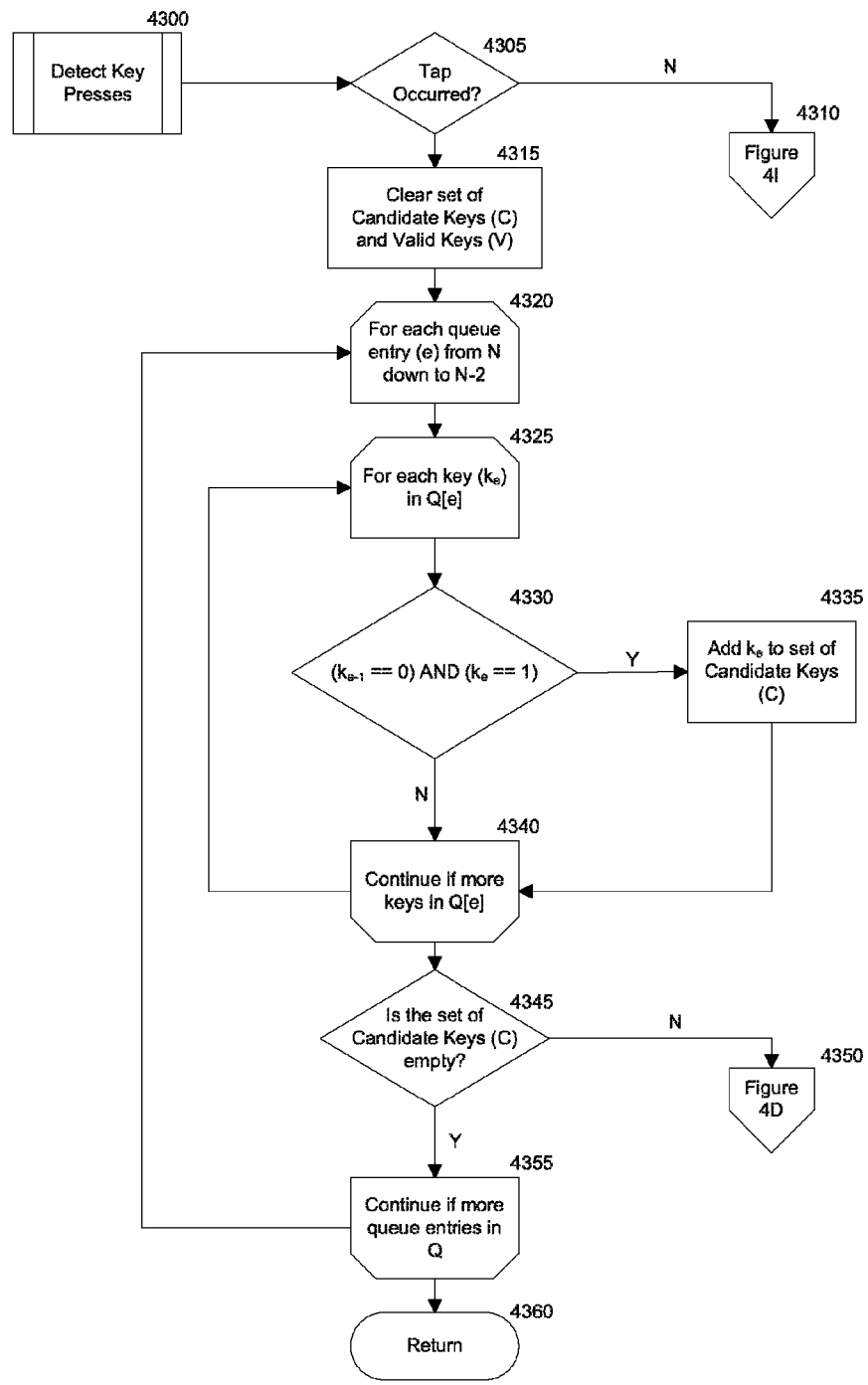
Figure 4D:
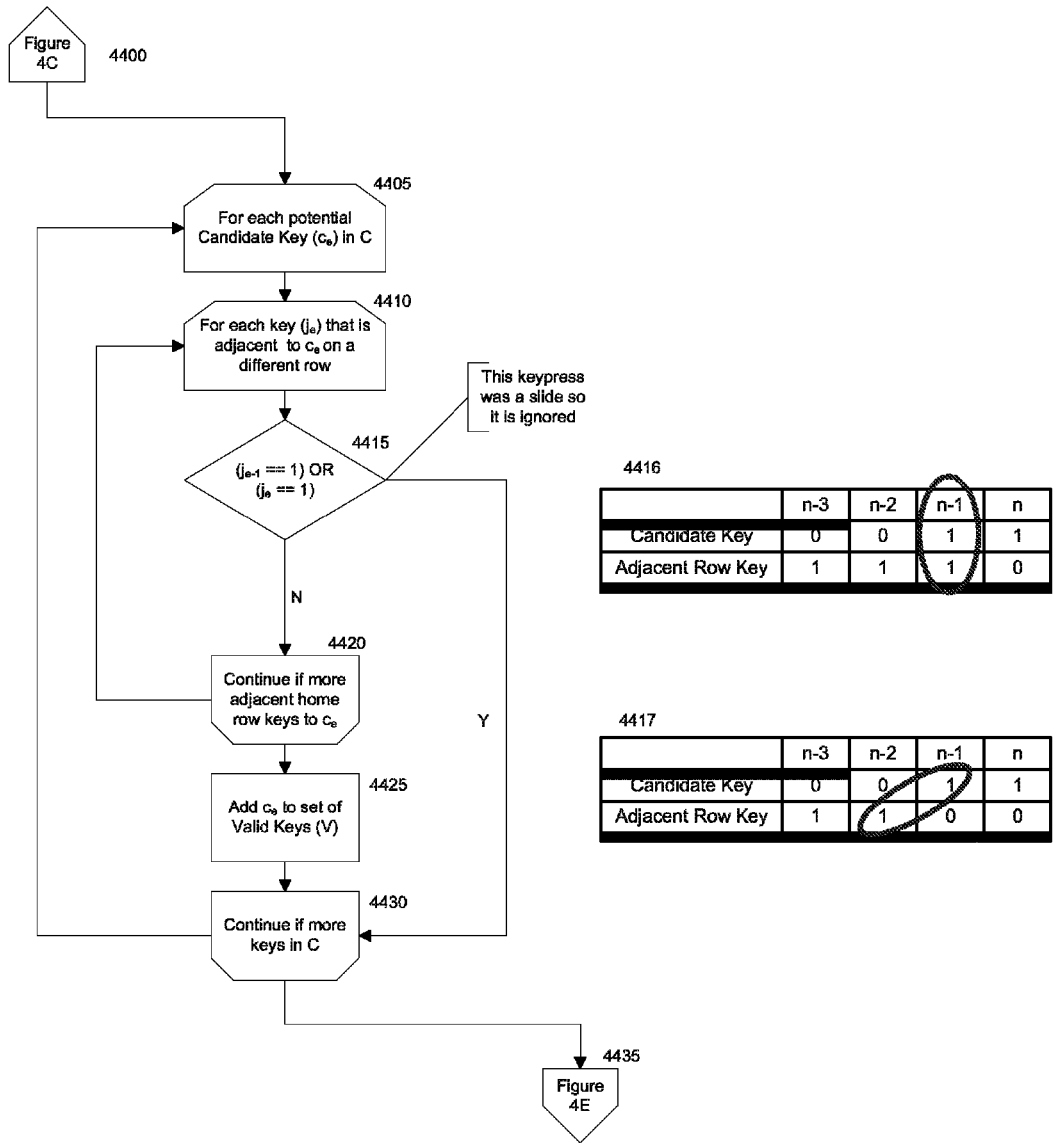
Figure 4E:
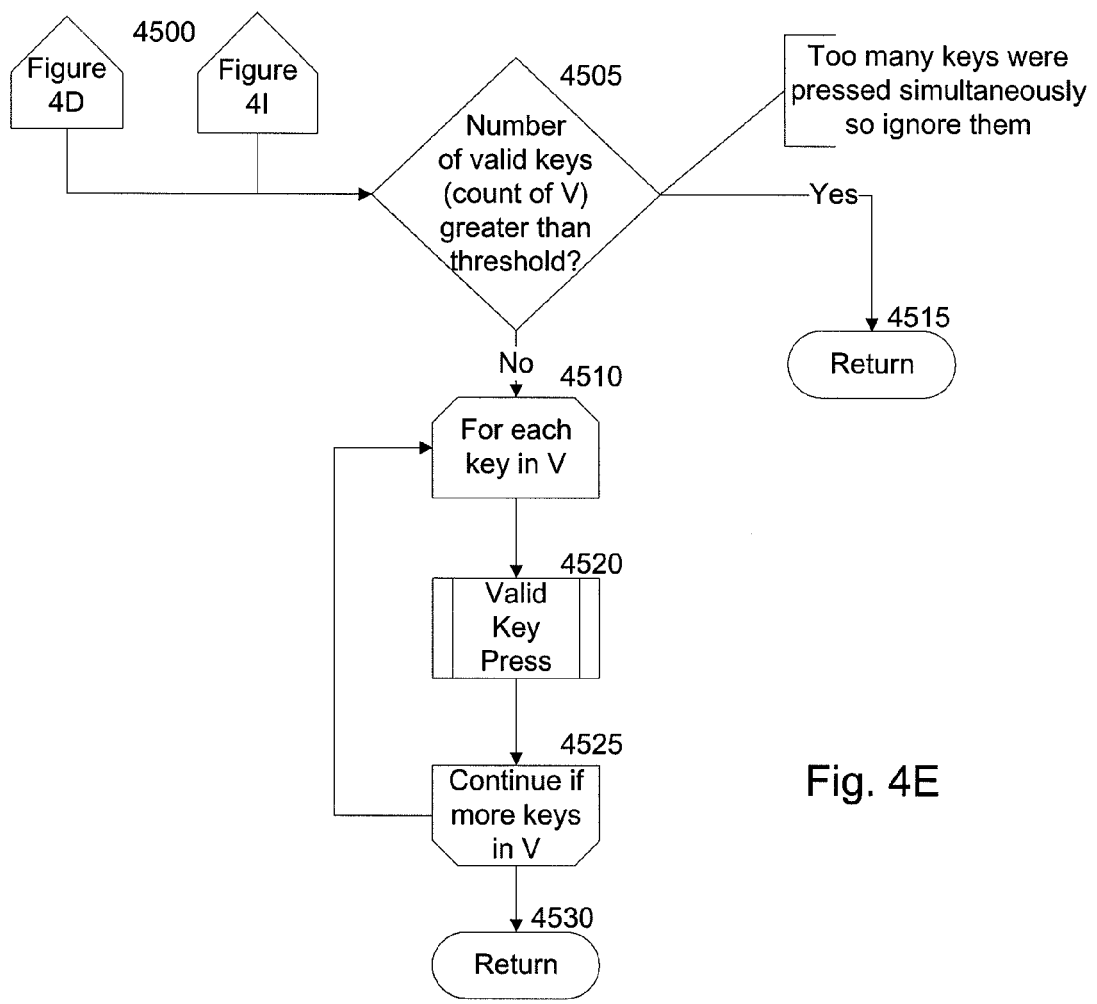
Figure 4F:
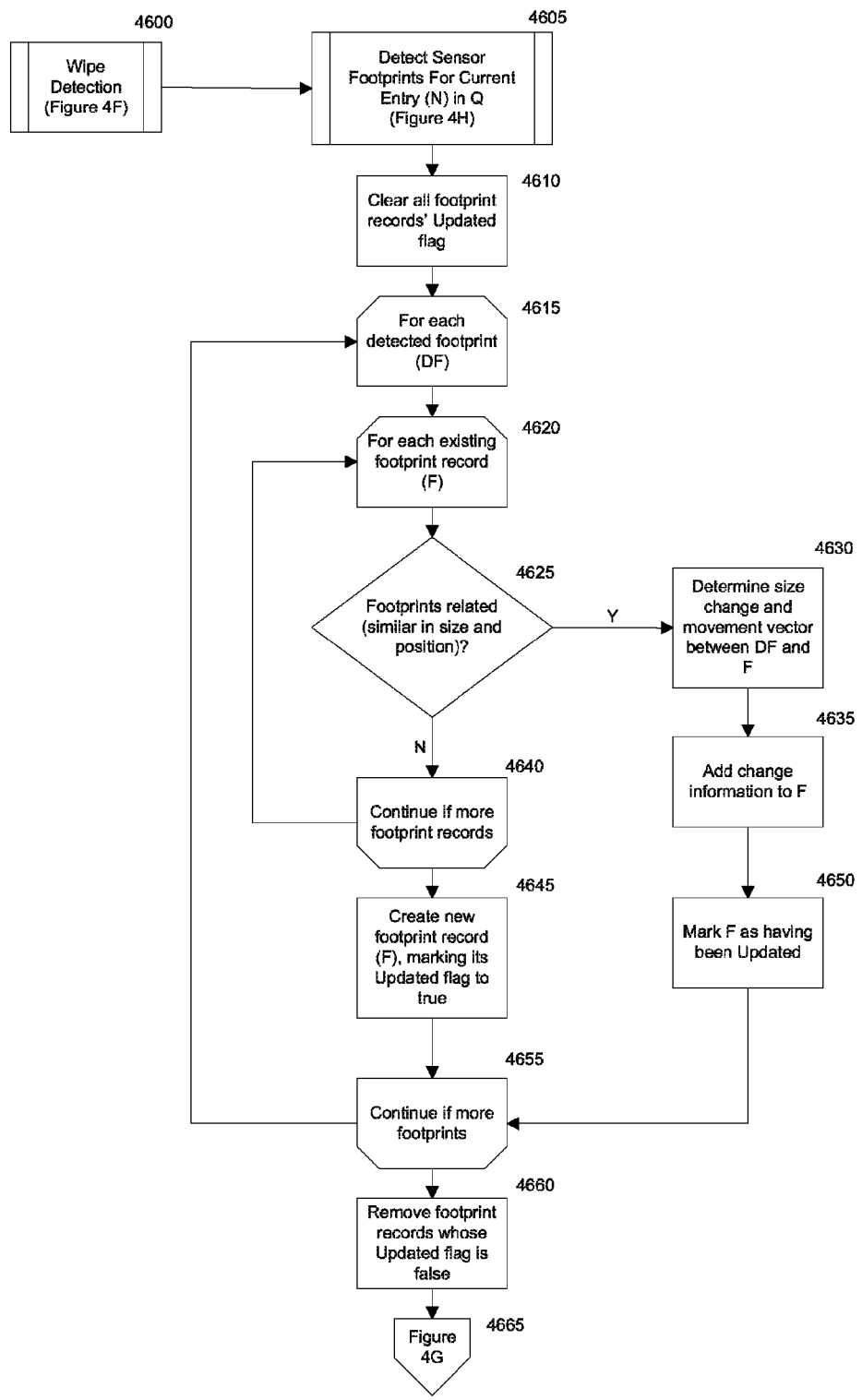

FIGS. 4A through 4I show a process flow chart of an embodiment of software 182 to implement the Cleanable Touch & Tap Sensitive Keyboard. FIG. 4A shows a flow chart of an embodiment of the Main Processing Routine 4100 of the Cleanable Touch & Tap sensitive Keyboard software 182. At block 4105, when the process is first started, various system variables are initialized including the digital status of the touch sensors (Q) and the analog level of the touch sensors (A). At block 4110, the process waits for a pre-determined polling period then captures the values of all the touch capacitive sensors in block 4115. A Key Release Detection routine of FIG. 4B is invoked at block 4120 to determine if a key that was previously asserted has been released. A Key Press Detection routine of FIG. 4C is invoked at block 4125 to determine if a key that was previously released has been asserted. A Wipe Detection routine of FIG. 4F is invoked at block 4130 to determine if a wipe motion has been detected on the keyboard and if so, to automatically suspend operation of the keyboard. The Wipe Detection routine can also be used to determine if the keyboard has been adequately cleaned.

FIG. 4B shows a flow chart of an embodiment of the Key Release Detection routine 4200. At block 4205 each key sensor status that is stored for the current sample (N) is acquired and compared with the status of the same key from the previous sample (N−1) in block 4210. If the key was asserted (ie. value=1) in the previous sample, but is unasserted in the current sample (ie. value=0) then the key is determined to have just gone through a valid key release state in block 4215. All keys are thus evaluated in block 4220 and then the routine returns in block 4225.

FIG. 4C shows a flow chart of an embodiment of the Key Press Detection routine 4300. This routine begins by determining if a valid tap has occurred in block 4305 as determined by the vibration sensor(s) 140. If no tap is detected, the routine goes on to the press detection routine in FIG. 4I in block 4310. If a valid tap is detected, the process begins by clearing the two data containers for Candidate Keys (ie. keys which have changed their state from unasserted to asserted) and Valid Keys (ie. keys which have been determined to be tapped on). Because the tap sensor and touch sensor may not be asserted at precisely the same moment in time, the comparison of the state of each key is bracketed by the current sample as well as the past two (or more) samples in block 4320 and block 4325. In block 4330, the routine determines if the current key being examined has changed from unasserted to asserted, and if so, it is marked as a Candidate Key in block 4335. The process continues in block 4340 until all keys have been examined. If there are no Candidate Keys identified, the process continues to FIG. 4D in block 4350. If there are Candidate Keys, the process continues in block 4355 until all keys in the queue have been examined and then the routine returns in block 4360.

FIG. 4D shows a flow chart of an embodiment of the continuation of the Key Press Detection routine of FIG. 4C in block 4400. At this point of the routine, at least one (or more) keys have been identified as Candidate Keys (ie. the key's touch sensor status has changed from unasserted to asserted). A common problem with touch capacitive keyboards is "phantom" key strokes that are the result of the user sliding their fingers from one row to an adjacent row when they are typing with another finger. When an accidental slide occurs, there is typically a moment in time when both adjacent keys are asserted at the same time as the finger slides between the two keys. The routine examines each candidate key in block 4405 and compares its status with keys that are adjacent to it on a different row in block 4410. In block 4415, if the adjacent key is asserted at the same time as the current sample of the asserted Candidate key, or if the adjacent key was asserted immediately prior to the current sample of the asserted Candidate key then the circumstance is deemed to be the result of a finger slide and the Candidate key is ignored. Block 4416 shows a table of a sample data set where a key slide has been determined due to the Candidate Key and the Adjacent Row Key being asserted at the same moment in time. In the table, it can be seen that while the candidate's asserted state went from a 0 to a 1 (qualifying it as a Candidate Key), an adjacent row key transitioned from asserted to unasserted, with at least one sample set n−1 where both the Candidate Key and Adjacent Row Key were asserted at the same time. Block 4417 shows a table of a sample data set where a key slide has been determined due to the Adjacent Row Key being asserted immediately before the moment in time when the Candidate Key was asserted. Since it is very unnatural and difficult to place a second finger on an adjacent row key at the same time the first finger is on a candidate key, it is assumed that the circumstance found to be true in 4415 most likely occurred as the result of the user sliding the same finger from one key to a key on an adjacent row. Since the premise of the Touch-Tap Cleanable Keyboard is that in order for a key to be valid, it must be tapped on or pressed (not just slid to), the circumstance found to be true in 4415 is ruled out as a Valid Key Press. This process continues for each adjacent-row key in block 4420. If the Candidate Key was found not to have occurred as the result of a slide motion, then it is added to the set of Valid Keys in block 4425. This process continues for each Candidate Key in block 4430. Once the slide analysis has been performed on each Candidate Key, the process moves on to the flowchart shown in FIG. 4E.

FIG. 4E shows a flow chart of an embodiment of the continuation of the Key Press Detection routine of FIG. 4D in block 4500. Block 4505 examines the total number of Valid Keys and determines if the number exceed an acceptable threshold. If so, the key presses are ignored. For example, a user could slap their entire open hand down on the keyboard which would result in multiple Valid Keys, even though the user was clearly not typing. If that is the case, the routine returns in block 4515. Otherwise, the routine determines a Valid Key was pressed and sends the command to the host computer terminal 194 in block 4520. The process continues for each Valid Key in block 4525 and then returns in block 4530.

FIG. 4F shows a flow chart of an embodiment of the Wipe Detection routine 4600. It is common for a user to forget to disable (or "pause") the keyboard's operation prior to cleaning it. It is therefore desirable to detect when a wiping motion occurs on the surface of the keyboard and automatically disable it for the user to avoid accidental keystrokes from being issued to the Host Computer Terminal 194. A Sensor Footprint Detection routine of FIGURE H is invoked in block 4605 to determine the size of the current "footprint" of the sensors. (The term "footprint" is used to describe a group of adjacent key sensors that are asserted at the same time). Block 4610 clears all footprint records' update flags in preparation for the analysis that will detect only newly-formed footprints or previous footprints that have moved. Blocks 4615, 4620, and 4625 retrieves each detected footprint and each existing footprint and compares their size and location. If the footprints are similar in size and location, Block 4630 determines the size change and movement vector between them, updates F in block 4635 and sets its Updated flag to true in 4650. If the DF and F footprints are not similar in size, the process continues to examine other footprint records in block 4640. Once all footprints have been compared, the process creates a new footprint record in 4645 and sets its Updated flag to true. The process continues for other detect footprints in block 4655. Once all detected footprints have been processed, all footprint records whose Updated flag is false are removed in block 4660 and the process continues in block 4665 to the flowchart shown in FIG. 4G, passing along newly-formed footprints and pre-existing footprints that have moved.

Figure 4G:
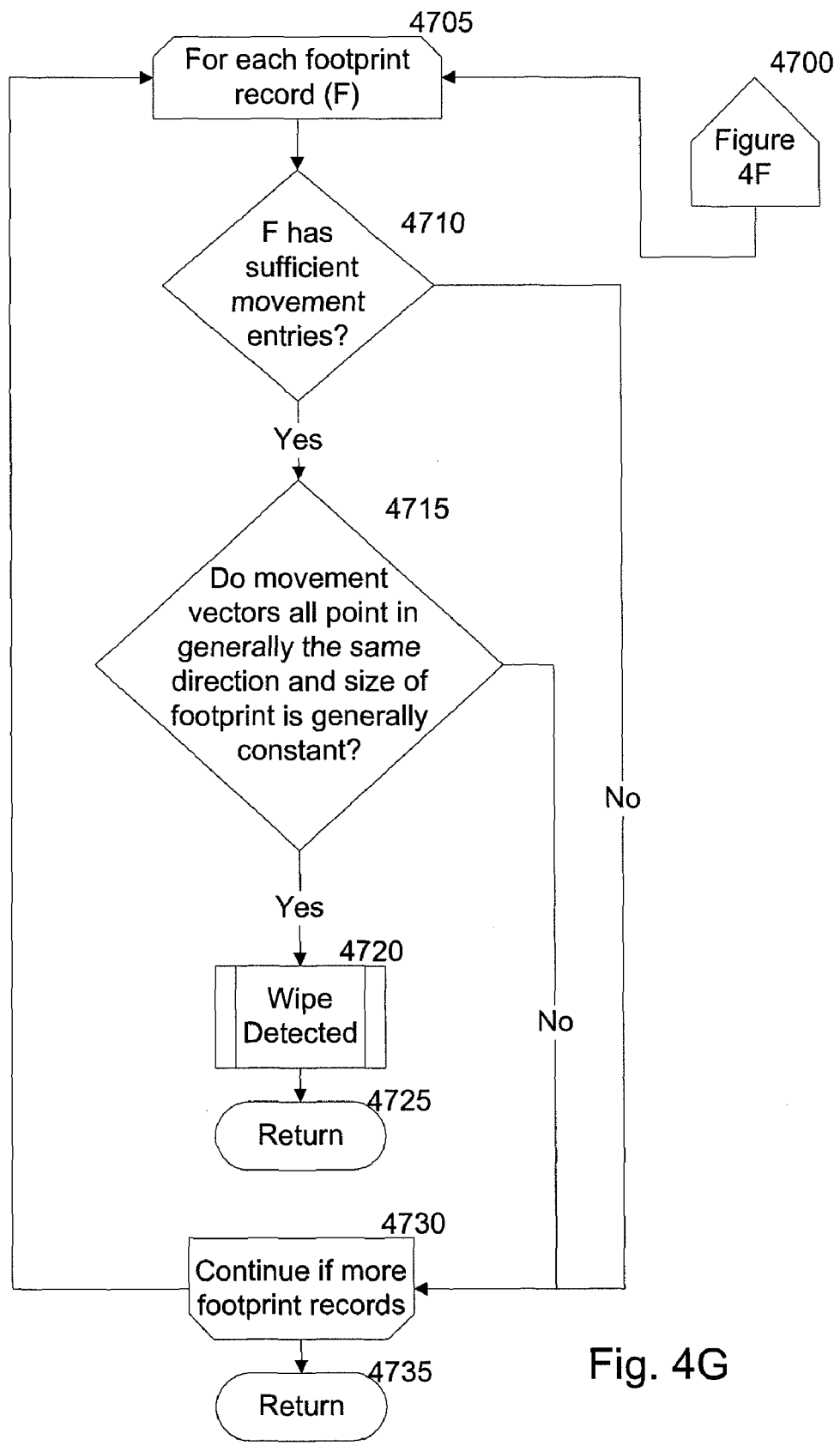

FIG. 4G shows a flow chart of an embodiment of the continuation of the Wipe Detection routine from FIG. 4F in block 4700. Each footprint record (F) is examined in block 4705. Block 4710 determines if there are enough footprint records to proceed with the wipe detection routine. If so, block 4715 determines if the of movement of the footprints are in the same direction and if the size of the footprints are relatively constant. If so, a valid wipe is declared in block 4720 and the process terminates in block 4725. If the analyzed footprints do not qualify as a wipe, the routine continues to examine all remaining footprints in block 4730 and then returns in block 4735.

Figure 4H:
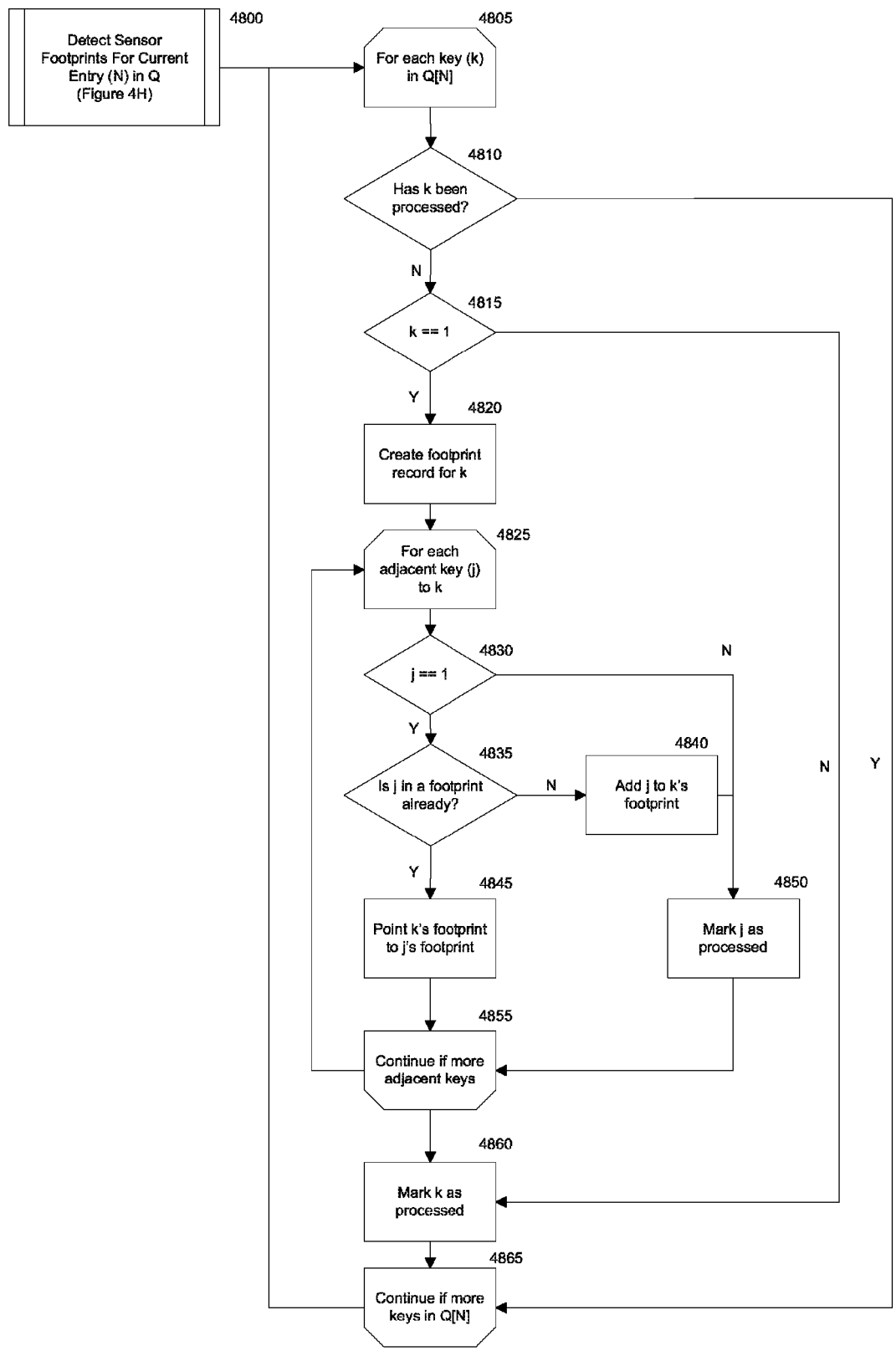

FIG. 4H shows a flow chart of an embodiment of the Sensor Footprint Detection routine 4800. The purpose of this routine is to find areas where a number of adjacent touch sensors are simultaneously asserted (ie. "footprints"). The routine begins by examining each key sensor in the Touch Capacitive Sensor History Array 191 in block 4805. Each key (k) is processed in block 4810 and checked to see if it is presently asserted in block 4815. If it is, a new potential footprint is created in block 4820. Block 4825 examines each key (j) that is adjacent to key (k) and checks if it is asserted in block 4830. If the adjacent key (j) is asserted then block 4835 checks to see if it is already included in the potential footprint. If not, block 4840 adds the adjacent key (j) to key (k)'s potential footprint. Block 4845 ensures that both key(k) and adjacent key(j) are referenced to each other. Block 4850 marks the adjacent key(j) as processed. The process continues in block 4855 until all potential adjacent keys have been examined, after which block 4860 marks the key(k) as processed. The entire process repeats in block 4865 until all keys have been examined.

Figure 4I:
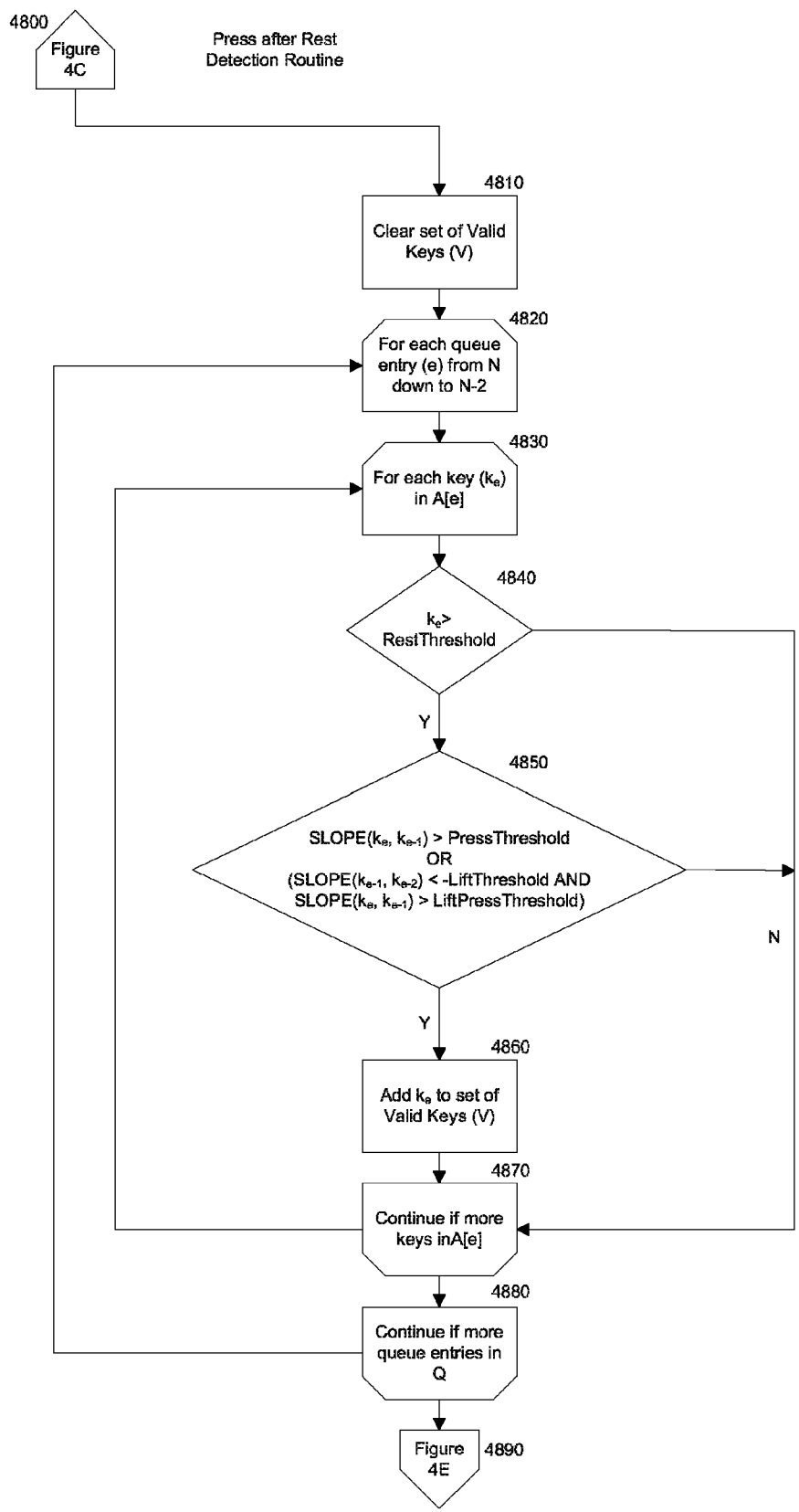

FIG. 4I shows a flow chart of an embodiment of the Press-after-Rest Detection routine. The process starts by clearing the set of Valid Keys (V) in block 4810. Block 4820 examines each entry in the queue (e) from the present sample (N) down to a determined previous sample (shown in this example as N−2). Block 4830 retrieves the analog signal value (A) for the touch sensor for each key (ke). Block 4840 determines if the analog signal value ke is above the Rest Threshold (ie. the sensor reading for a typical resting finger). If the analog signal value ke is not above the Rest Threshold, the process skips to block 4870 where the next key is processed. If the analog signal value ke is above the Rest Threshold, block 4850 determines if the change in the analog signal value between ke and the previous sample ke−1 exceeds the Press Threshold (shown as SLOPE(ke, ke−1)). Block 4850 also determines if the change immediately prior to ke−1 was a slight lift, followed by a press (to account for the instance when a user may lift their finger slightly on a key without completely taking it off the key, just prior to asserting a press motion). If either of these conditions exist, the process adds ke to the set of Valid Keys (V) in block 4860. If either of these conditions do not exist, the process continues by examining the next keys A(e) in block 4870. Once all keys are considered in block 4880, the process exits back to the flowchart shown in FIG. 4E, in block 4890.

There are a number of optionally advantageous aspects of the keyboard as disclosed herein. An example set of optionally advantageous aspects are itemized below: the use of hardened acrylic, glass, annealed glass, or other scratch-resistant transparent material for the top surface; the use of anti-microbial solid surface material as the base of the enclosure; the use of aluminum (formed, machined, etc) as the base of the enclosure; the method of adhering the transparent top surface to the base; sealing the enclosure against intrusion of liquid or dust to the interior of the enclosure; the use of iridium tin oxide (ITO) to provide conductive transparent traces for the touch sensor; and/or though the use of ITO technology, the ability to make the keyboard completely transparent by etching or otherwise affixing the key images to the underside of the glass, as well as the ITO traces; and the use of a replaceable snap-on transparent cover for the top surface.

The keyboard is ideally suited to easy cleaning and disinfection. As described above, the operation of the keyboard can be temporarily suspended, either by a key combination or a wipe detection, and then sanitized or disinfected. In another aspect, the system is able to determine when it is likely that the touch surface has become contaminated to the point that it should be cleaned. It does this by keeping track of the cumulative activity that has taken place on the touch surface since the last cleaning. The activity level is determined by a combination of one or more of the following factors: the number of touches on the surface (using the touch sensors 130), the number of slides over the surface (using the touch sensors 130), the number of taps on the surface (using the vibration sensor 140), the amount of movement of the keyboard (using the vibration sensor 140), and the number of times the proximity sensor has been activated (using the proximity sensor 120). When the activity level reaches a user-settable threshold, then a contamination alert is activated (which may be a light, a series of lights, an audible sound, or an electronic notification to the host computer terminal).

In an embodiment, host computer terminals are part of a computer network, over which an administrator could monitor the contamination status of each keyboard connected to the host computer terminals. For example, a hospital infection control steward could be notified if any keyboards are beyond the contamination threshold and could take steps to quickly have those devices disinfected, thereby maintaining the integrity of the infection controlled environment.

In another aspect, the system is able to determine when the touch surface has been wiped sufficiently enough to clear the contamination alert. When a wiping action takes place, a "footprint", or multiple activated adjacent touch sensors, traverses across the plane of the surface/keyboard. The path of the footprint is observed by the system thereby making it possible to detect whether or not the wiping activity took place over the entire surface of the keyboard, and also how many wipes back and forth took place. Once the wiping activity reaches a user-definable threshold, the contamination alert is deactivated, as explained in FIGS. 5A through 5E below.

Figure 5A:
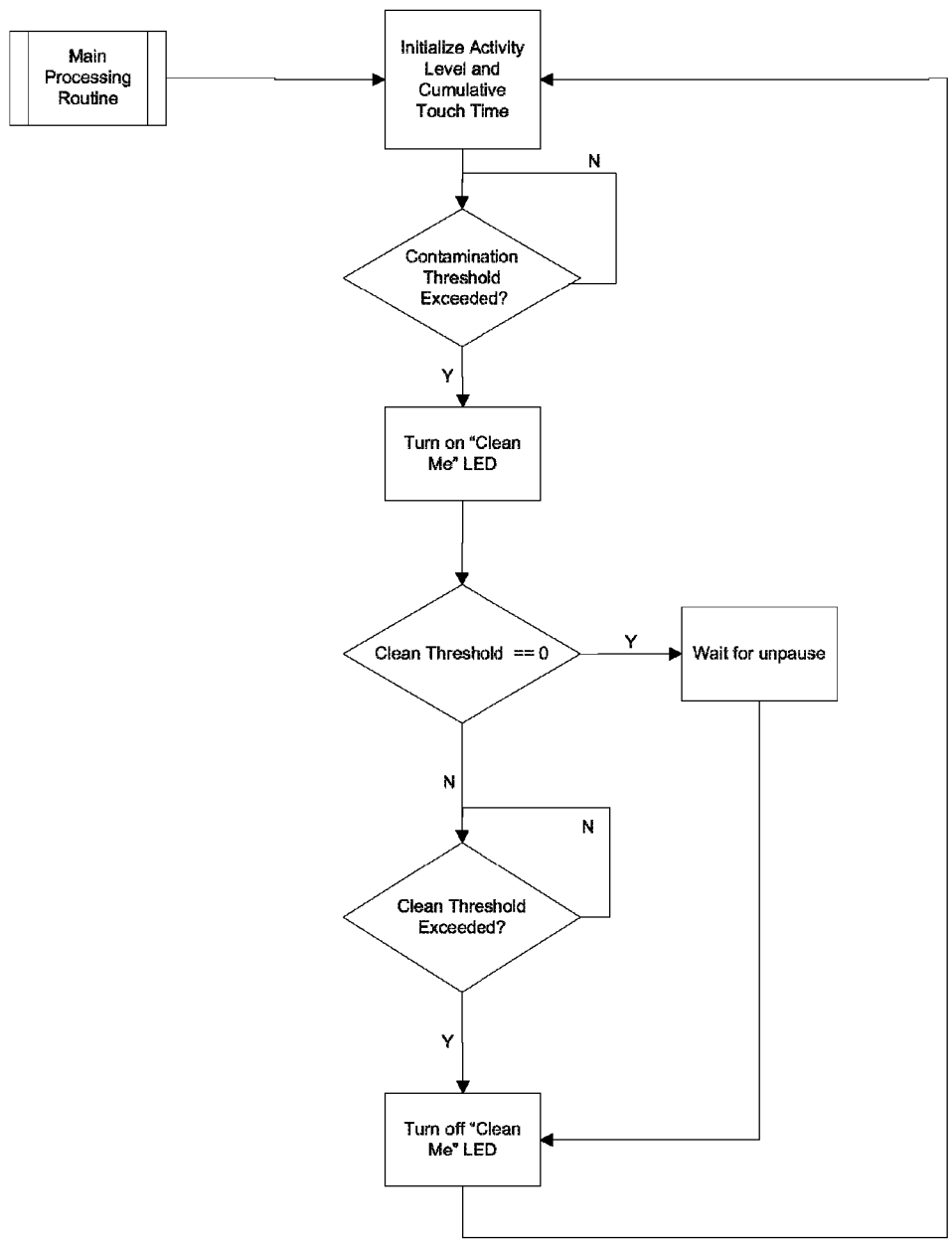
FIGS. 5A through 5E show an embodiment of a software algorithm to implement the method of the present invention in order to detect contamination and clean conditions of the surface of the device.

FIGS. 5A through 5E show a process flow chart of an embodiment of software 182 to implement a contamination and clean detection process. FIG. 5A shows a flow chart of an embodiment of the Main Processing Routine 5100 of the Contamination and Clean Detection routines of the Cleanable Touch & Tap sensitive Keyboard software 182. Block 5110 initializes an "Activity Level" variable AL. This variable is used to track the amount of activity on the surface of the keyboard that may contribute to its contamination. Block 5120 checks to see if the Contamination Threshold has been exceeded (see FIG. 5B). If the threshold isn't exceeded, the routine continues in a loop until the Contamination Threshold is exceeded, upon which it activates the Contamination Alert in block 5130. Block 5140 determines if the keyboard user setting is set to use the clean wipe detection routine. If not, the process waits for a keyboard pause and unpause in block 5150 and then clears the Contamination Alert. If the keyboard user setting is set to use the clean wipe detection routine, then the process waits at block 5160 until the Clean Threshold has been exceeded (see FIG. 5C). Once the Clean Threshold has been reached, the process clears the Contamination Alert in block 5170 and then loops back to begin the process again from the start at block 5110.

Figure 5B:
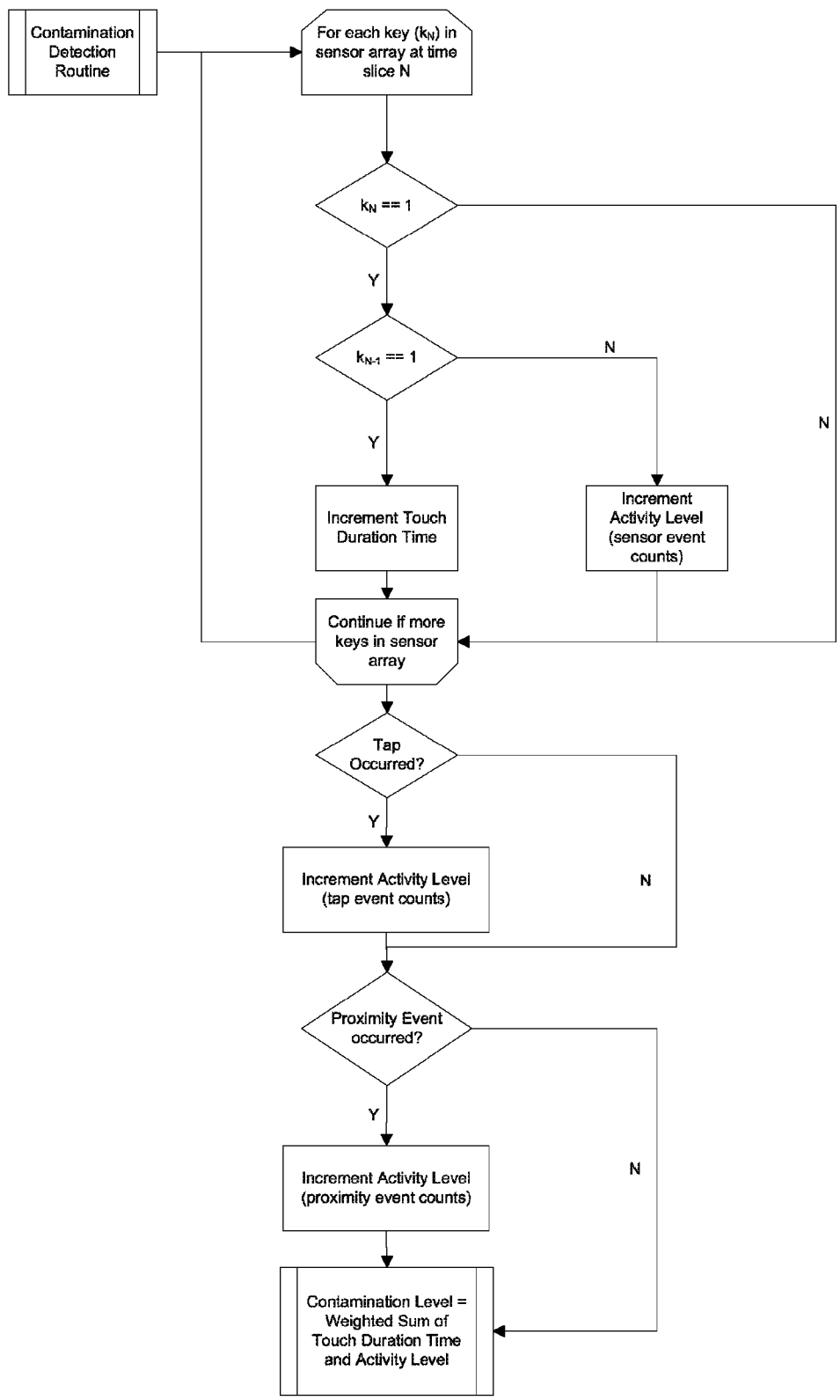

FIG. 5B shows a flowchart of an embodiment of the Contamination Detection routine 5200 of the Cleanable Touch & Tap Sensitive Keyboard. Block 5205 examines each touch sensor and determines if it is asserted in 5210. If it is asserted, the Activity Level counter is incremented in block 5220 and loops back to check other keys in block 5230. Block 5235 determines if the device is being moved (via the vibration sensor, also known as an accelerometer). If so, the Activity Level counter is incremented in block 5250. Block 5255 determines if the user's hands have approached the keyboard (via the proximity sensor 120). If so, the Activity Level counter is incremented in block 5260. A weighted sum of all activity triggers is calculated in block 5265 to determine the Contamination Level for the given time slice n.

Figure 5C:
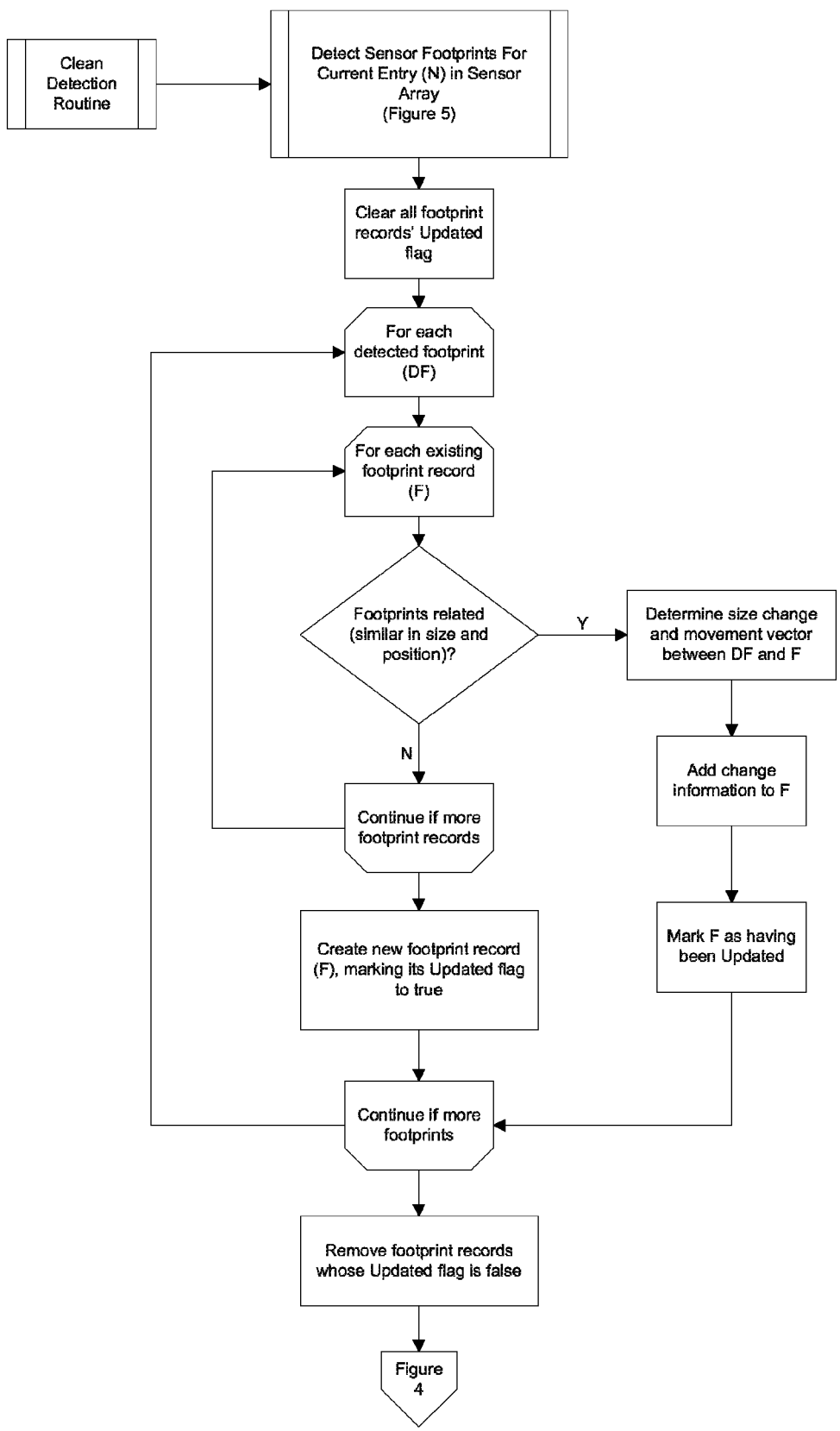

FIG. 5C shows a flowchart of an embodiment of the Clean Detection routine 5300 of the Cleanable Touch & Tap Sensitive Surface device. Block 5305 determines what, if any, sensor "footprints" exist (see FIG. 5E). The remainder of the flowchart in this figure determines if the identified footprint is a valid moving footprint, the same as described for FIG. 4F (refer to the description for FIG. 4F above). The process then continues on to FIG. 5D via block 5365.

Figure 5D:
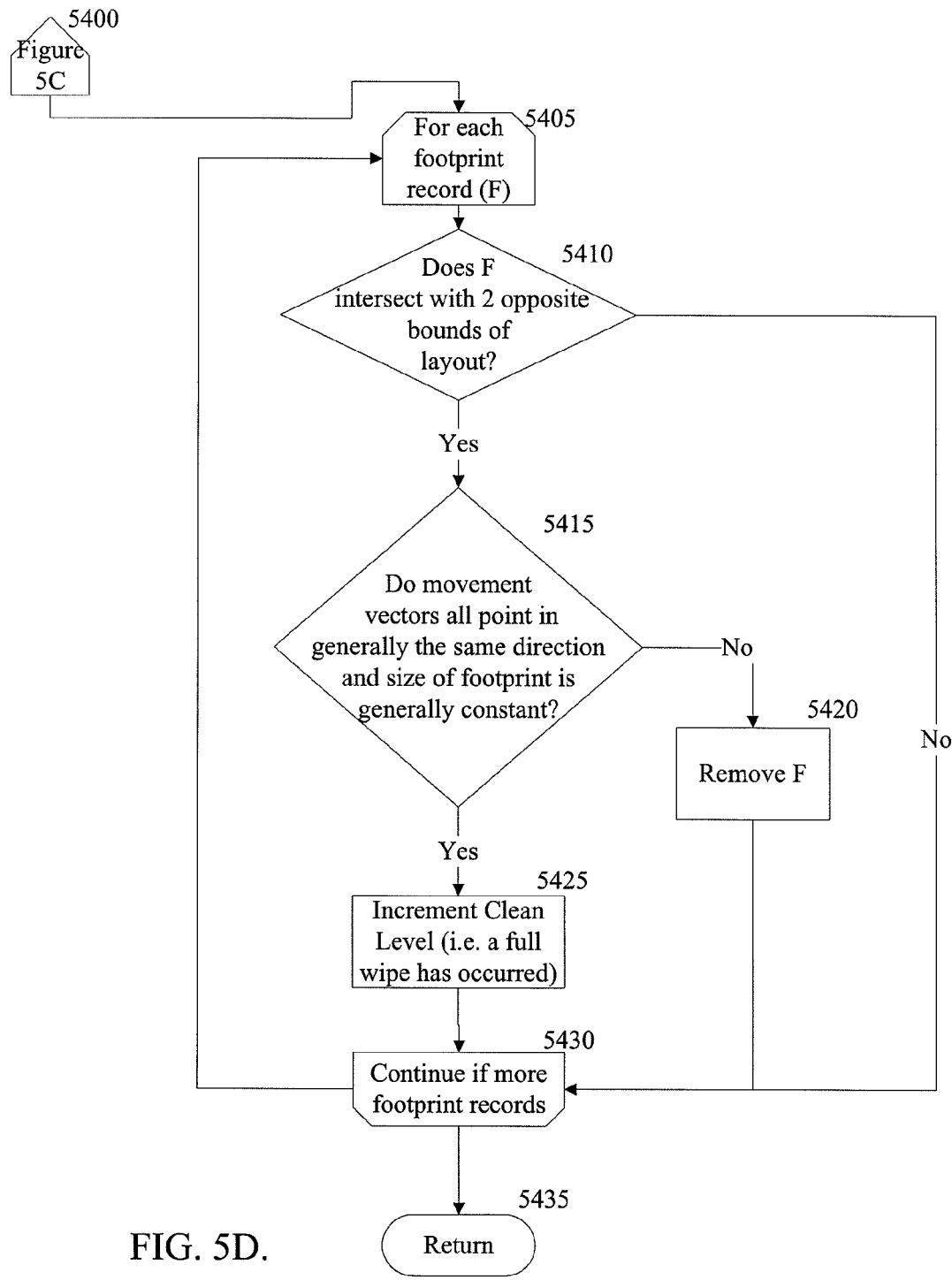
Figure 5E:
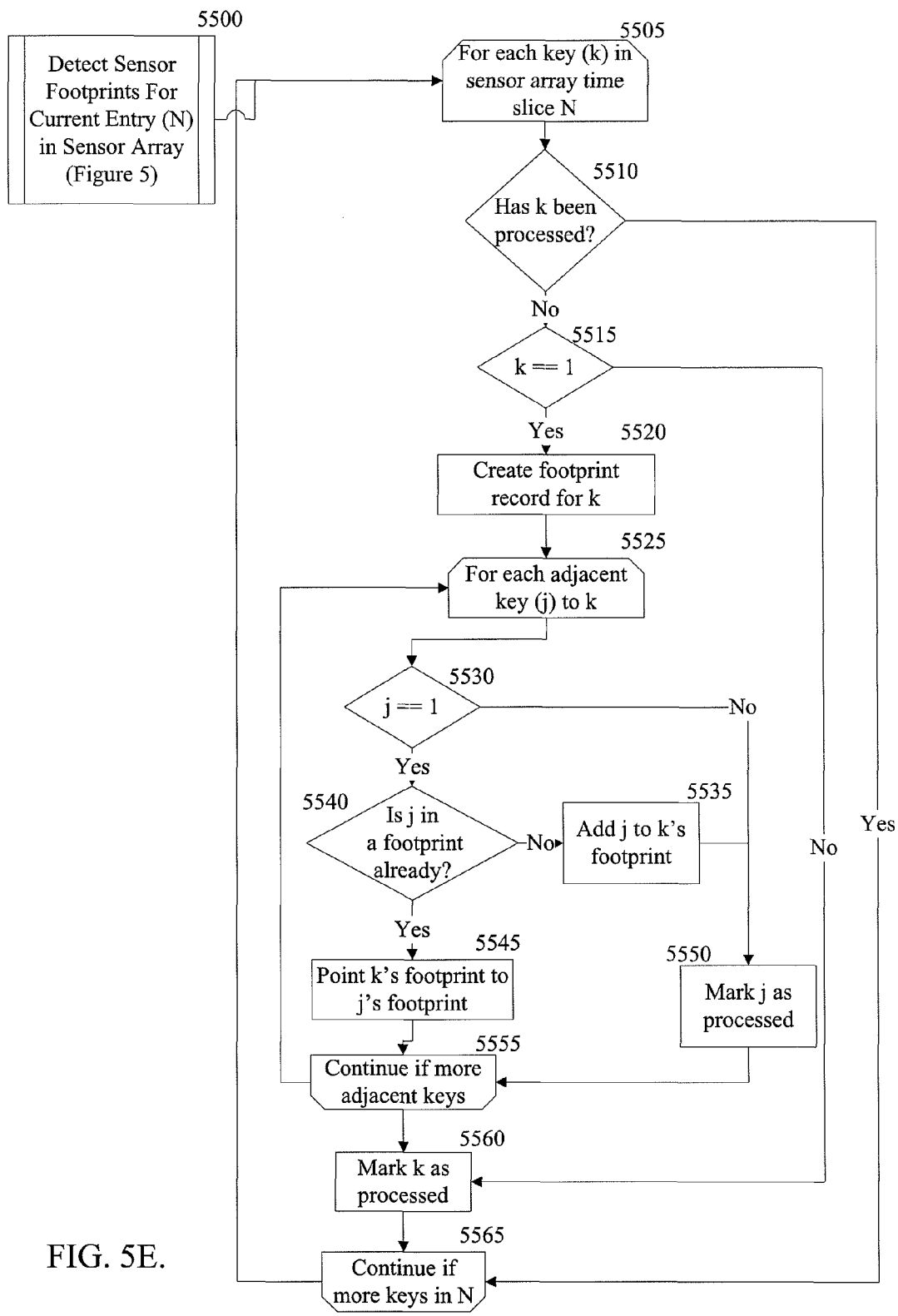

FIG. 5D shows a flowchart of an embodiment of the continuation of the Clean Detection routine 5400 of the Cleanable Touch & Tap Sensitive Surface device. Block 5405 examines each footprint record (F) determined from analysis in FIG. 5C. Block 5410 determines if the footprint is at or near the edge of the touch surface. If not, the process continues looking at other footprints. Block 5415 ensures that all sensors making up the footprint moved in the same general direction and the size of the footprint remained generally consistent. If not, then it is determined to not be a valid moving footprint and "F" is removed from the candidate footprints in block 5420. Otherwise, the Clean Level counter is incremented in block 5425 (since a wipe has traversed to the edge of the touch surface). This continues for all footprint records in block 5430 and then returns in block 5435. A user setting stored in memory 192 determines the Clean Level Threshold. Once the Clean Level Threshold has been exceeded, the Contamination Alert is cleared and the surfaced is deemed to have been adequately cleaned.

In another aspect, the system is able to determine when the touch surface has been wiped sufficiently enough to clear the contamination alert. When a wiping action takes place, a "footprint", or multiple activated adjacent touch sensors, traverses across the plane of the keyboard. The path of the footprint is observed by the system thereby making it possible to detect whether or not the wiping activity took place over the entire surface of the keyboard, and also how many wipes back and forth took place. Once the wiping activity reaches a user-definable threshold, the contamination alert is deactivated.

In another aspect, the keyboard may be placed in a sterilization device (commonly referred to as an "autoclave").

In another aspect, a dynamic display (such as an LCD or "electronic ink" display) can be placed below the top planar surface such that the functional assignment for each key as well as the associated visual display can be changed dynamically, which is referred to as "softkeys" hereafter.

In another aspect, the dynamic key assignment may be determined manually by the user, or automatically by the system according to contextual changes on the host computer. For example, one set of softkeys may be displayed for the current application, but then automatically change when a new application becomes active. Individual keys may also change within an application itself, depending on the workflow being followed. The implementation of this feature may take advantage of certain tools offered by the operating system on the Host Computing Terminal (eg. Widgets and Sideshow provided in the Windows operating system).

It is desirable to provide the user with some sort of haptic feedback to the touching and actuation of a key. This may be accomplished in a number of ways, which include but are not limited to "strikers," strikers are interspersed throughout the keys that strike the glass surface from beneath and give a tactile response to a key press. (i.e. the user would feel the sharp vibration of the striker hitting the glass whenever they touched a key).

In another embodiment, the keyboard would vibrate when a key is actuated. (Similar to how a cell phone or pager vibrates).

In yet another embodiment, a tactile actuator is positioned between the touch surface and the supporting base of the keyboard. When a key is pressed, the entire top surface depresses slightly against the tactile actuator, which produces a tactile response. (This is similar to the feel and construction of a simple "clicking" switch).

Because the surface of the device is continuous, individual keys do not have their own mechanical moving structure (as on traditional keyboards). Therefore, it may be possible for the user to miss tapping on the desired key by a small margin of error (between two keys, for example). In such a case, the system would still detect a tap but the key location of the tap would be ambiguous. To help improve accuracy, lexicon-based databases can be stored in the system, including databases of common words, common letter-pairs, and common next-words. When an ambiguous key activation occurs, the algorithm can disambiguate the choice by referring to the databases to find the most likely letter of all the candidate ambiguous letters. This disambiguation is done on a letter-by-letter basis without presenting any alternate choices to the user via a display mechanism (which distinguishes it from prior art).

Because the surface is touch-sensitive and the user is permitted to rest their fingers on the surface of the keys, it is difficult to determine the difference between when the user intends for a key to be asserted as held down and when they are simply resting their finger on the key after tapping on it. This problem is solved by implementing a special gesture for initializing a key repeat (or key press and hold). The user first taps on the desired key, quickly lifts their finger from the key, and then taps again and holds their finger on the key in quick succession. From that point forward, as long as the user holds their finger on the key, it is deemed to be asserted (or pressed). To end the key assertion, the user lifts their finger from the key.

In yet another embodiment, the contamination level of the touch surface can be determined using optical methods. For example, the transparent top surface forms a light channel through which infrared or visible light is transmitted from one side to the other, where a photodiode detects the level of light propagated. When contamination, such as oily fingerprints, occurs on the outside of the touch surface, a certain amount of light escapes from the channel (employing Snell's law). In yet another embodiment, lasers may be used to scan the touch surface to detect contamination.

While the focus of the embodiment described herein is for a keyboard application, someone skilled in the art will see that the system could also be successfully applied to any type of touch-screen device.

While the preferred embodiment of the invention has been illustrated and described, as stated above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of discerning user input on a solid planar touch-sensitive surface, the method comprising:
   at a processor,
      recording two or more concurrent user touches of the solid planar touch-sensitive surface based on two or more signals generated by a plurality of touch sensors included in the touch-sensitive surface;
      receiving vibration signals from one or more vibration sensors coupled to the touch-sensitive surface; and
      determining whether the vibration signals constitute a user tap event, based on pre-defined criteria; and
      correlating the two or more concurrent user touches with the determined user tap event to disambiguate between the user resting on the touch surface and asserting a selection on the touch surface, thereby outputting an action associated with the asserted selection,
   wherein the touch sensors are physically and operationally different than the vibration sensors.

2. The method of claim 1, wherein the solid planar touch-sensitive surface comprises a plurality of alphanumeric keys associated with corresponding touch sensors.

3. The method of claim 2, wherein the touch-sensitive surface comprises first tactile markers identifying the location of each key.

4. The method of claim 3, wherein the first tactile markers are shallow indentations on the touch-sensitive surface.

5. The method of claim 3, wherein second tactile markers that are distinguished from first tactile markers are placed on predesignated home keys.

6. The method of claim 3, wherein second tactile markers that are distinguished from first tactile markers are placed on outer-lying keys.

7. The method of claim 2, further comprising at a communication device communicating with a host computer by wired or wireless methods.

8. The method of claim 2, further comprising generating a command signal after a combination of keys have been asserted.

9. The method of claim 2, further comprising at the processor suspending operation of the surface by activating a disabling key combination of one of a single key, two or more simultaneous key activations, or a series of two or more sequential key presses.

10. The method of claim 2, wherein user settings are changeable on the touch surface.

11. The method of claim 10, wherein the user settings are displayed on a plurality of LED indicators.

12. The method of claim 2, further comprising:
   at the processor,
      receiving a second tap event signal; and
      asserting a key press and hold event based on the received second tap event signal and a recorded user touch on the same key associated with the previous asserted selection.

13. The method of claim 1, further comprising at an output device emitting an audible sound when a selection is asserted.

14. The method of claim 1, further comprising at the processor determining when one of the touch sensors has been touched according to a sliding motion.

15. The method of claim 14, wherein the asserted selection is associated with one of the touch sensors that was not recently determined to have been touched according to the sliding motion.

16. The method of claim 1, further comprising:
   at the processor,
      detecting a wiping motion based on the recorded user touches; and
      suspending assertions when a wiping motion has been detected.

17. The method of claim 16, further comprising removing one or more selections asserted before detection of the wipe motion.

18. The method of claim 1, wherein the surface performs the function of a mouse pointing device.

19. The method of claim 1, wherein the surface is a touch-screen on a dynamic display computing device.

20. The method of claim 1, wherein the surface comprises a numeric keypad.

21. The method of claim 1, wherein the surface is user definable.

22. The method of claim 1, wherein sensitivity of the touch sensors is adjustable.

23. The method of claim 1, wherein the sensitivity of the vibration sensors is adjustable.

24. The method of claim 1, further comprising:
   at a proximity sensor
      generating a sensing signal when an object comes within a threshold distance;
   at the processor,
      sensing when the user is about to use the surface based on the sensing signal; and
      changing from a low power consumption state of the surface to a full power operation state when it is sensed the user is about to use the surface.

25. The method of claim 1, further comprising:
   at the processor,
      determining a number of recorded user touches since a predefined condition; and
      enabling a warning indicator if the determined number of recorded user touches exceeds a threshold.

26. The method of claim 1, further comprising at the processor cumulatively recording a level of user interaction with the touch surface until a first contamination threshold is reached.

27. The method of claim 26, further comprising at the processor asserting an alert when the first contamination threshold is reached.

28. The method of claim 27, wherein the alert is at least one of a warning light, an audible sound, a vibration, or a command sent to a host computer terminal.

29. The method of claim 27, wherein cumulatively recording is continued until a first user cleaning threshold is exceeded.

30. The method of claim 29, wherein the first user cleaning threshold is based on a number of wipes and touch surface area wiped.

31. The method of claim 29, further comprising at the processor unasserting the alert when the cleaning level threshold is exceeded.

32. The method of claim 27, wherein the first user cleaning threshold is based on an array of the touch sensors.

33. The method of claim 27, wherein the level of user interaction comprises one or more of recorded user touches, received tap events, sensed movements of the surface or determinations when the user is in close proximity of the device.

34. The method of claim 1, wherein a key is asserted to be held down by tapping the surface at the location of the key, lifting and then tapping and holding again in quick succession.

35. The method of claim 34, wherein a key that is asserted to be held down is released by lifting off the key.

36. The method of claim 1, further comprising:
at the processor,
receiving a signal associated with a sensed movement of the touch surface; and
suspending operation of the surface if the sensed movement is above a predefined threshold.

37. A system comprising:
a means for recording two or more concurrent user touches of the solid planar touch-sensitive surface based on two or more signals generated by a plurality of touch sensors included in the touch-sensitive surface;
a means for receiving vibration signals from one or more vibration sensors coupled to the touch-sensitive surface; and
a means for determining whether the vibration signals constitute a user tap event, based on pre-defined criteria; and
a means for correlating the two or more concurrent user touches with the determined user tap event to disambiguate between the user resting on the touch surface and asserting a selection on the touch surface, thereby outputting an action associated with the asserted selection,
wherein the touch sensors are physically and operationally different than the vibration sensors.

* * * * *